(12) United States Patent
Barnes

(10) Patent No.: US 9,146,111 B2
(45) Date of Patent: Sep. 29, 2015

(54) METHOD AND APPARATUS FOR A TRANSIT TIMELINE

(71) Applicant: NAVTEQ B.V., LB Veldhoven (NL)

(72) Inventor: Craig Barnes, Forest Park, IL (US)

(73) Assignee: HERE Global B.V., Veldhoven (NL)

( * ) Notice: Subject to any disclaimer, the term of this patent is extended or adjusted under 35 U.S.C. 154(b) by 74 days.

(21) Appl. No.: 13/887,202

(22) Filed: May 3, 2013

(65) Prior Publication Data

US 2014/0330517 A1 Nov. 6, 2014

(51) Int. Cl.
*G01C 21/00* (2006.01)
*G06Q 10/06* (2012.01)
*G06Q 10/10* (2012.01)

(52) U.S. Cl.
CPC .............. *G01C 21/00* (2013.01); *G06Q 10/06* (2013.01); *G06Q 10/10* (2013.01)

(58) Field of Classification Search
CPC ............ G01C 21/00; G06F 3/00; G06F 3/048
USPC .................................. 701/400, 431, 436, 541
See application file for complete search history.

(56) References Cited

U.S. PATENT DOCUMENTS

| | | | |
|---|---|---|---|
| 8,522,163 B2 * | 8/2013 | Relyea et al. ................. | 715/834 |
| 2004/0243430 A1 | 12/2004 | Horstemeyer | |
| 2008/0109718 A1 | 5/2008 | Narayanaswami | |
| 2011/0070924 A1 * | 3/2011 | Kim .............................. | 455/566 |
| 2012/0147030 A1 * | 6/2012 | Hankers et al. ............... | 345/619 |
| 2013/0073984 A1 | 3/2013 | Lessin et al. | |

FOREIGN PATENT DOCUMENTS

EP 1762968 A1 3/2007

OTHER PUBLICATIONS

Sparkline, Wikipedia, en.wikipedia.org/wiki/sparkline, printed on Aug. 22, 2013, 2 pages.
Stott, Jonathan, et al., "Automatic Metro Map Layout Using Multicriteria Optimization," Journal of Latex Class Files, vol. 6, No. 1, Jan. 2007, 30 pages.
Tube Map, Wikipedia, en.wikipedia.org/wiki/Tube_map, printed on Aug. 22, 2013, 11 pages.
European Search Report received in European Application No. 14166286.6-1955 dated Jul. 25, 2014, 7 pages.
The Economist, Mapnificint, A Time-Based Transit Map, dated Jun. 5, 2011, 3 pages.

* cited by examiner

*Primary Examiner* — John Q Nguyen
*Assistant Examiner* — Anshul Sood
(74) *Attorney, Agent, or Firm* — McClure and Associates, PLLC

(57) ABSTRACT

A method comprising determining a transit timeline indicative of a commute from a start location to a destination location, and causing display of a representation of the transit timeline such that, at least part of, the transit timeline is configured to surround a center point such that time along the transit timeline is represented by an angle from the center point is disclosed.

20 Claims, 9 Drawing Sheets

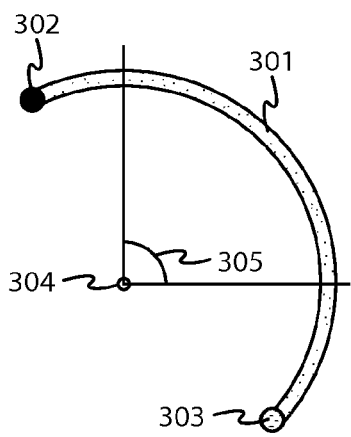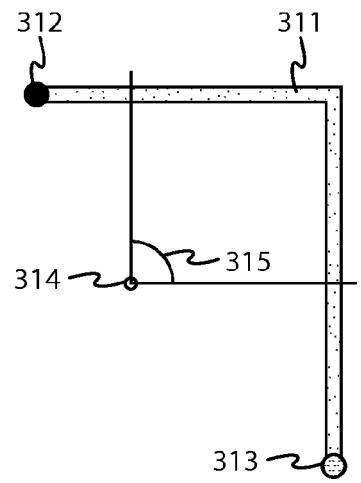
FIG. 3A  FIG. 3B
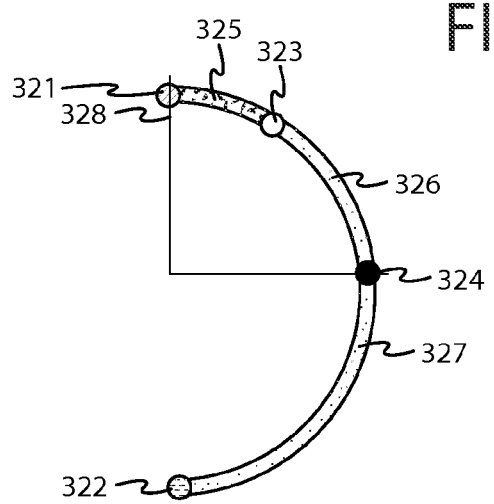
FIG. 3C
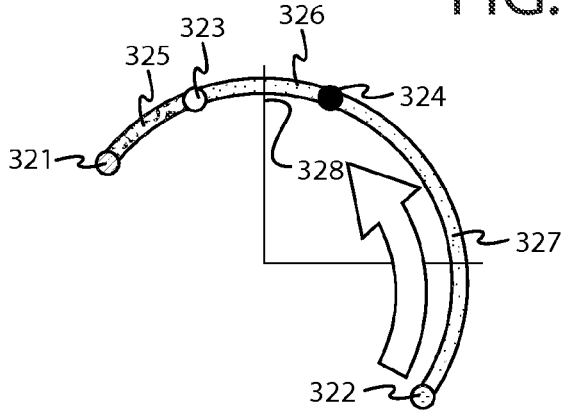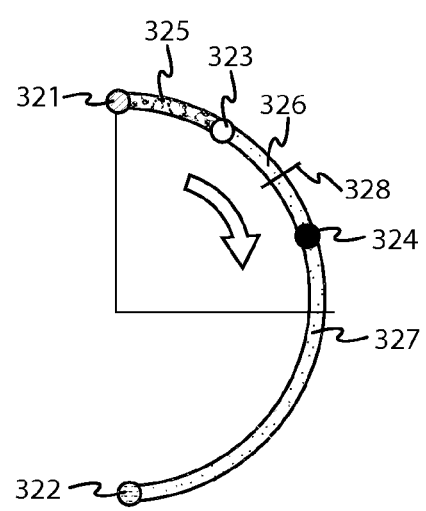
FIG. 3D  FIG. 3E

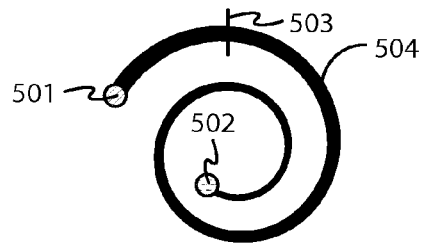
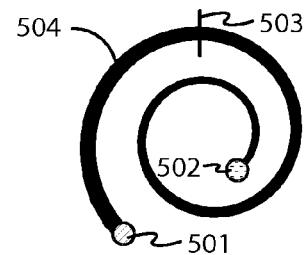
FIG. 5A    FIG. 5B
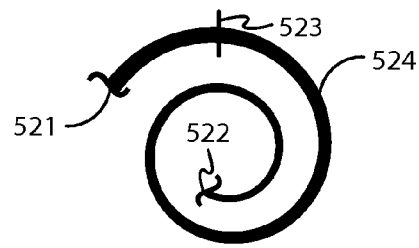
FIG. 5C
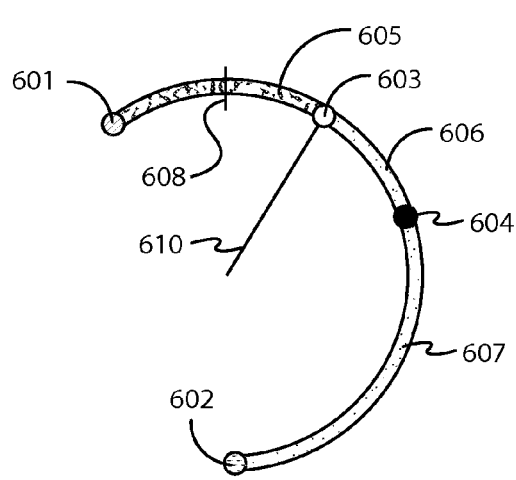
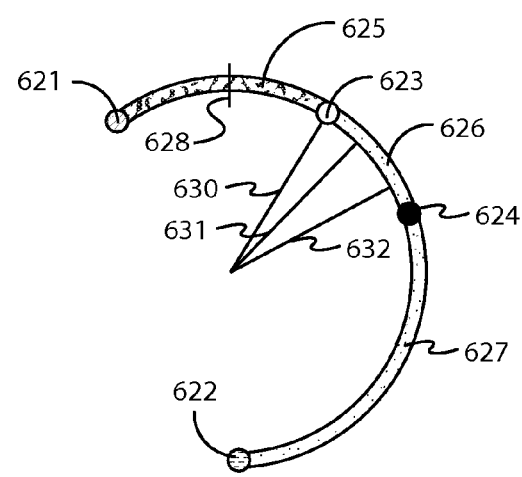
FIG. 6A    FIG. 6B

METHOD AND APPARATUS FOR A TRANSIT TIMELINE

TECHNICAL FIELD

The present application relates generally to a transit timeline.

BACKGROUND

Many users have become dependent on electronic apparatuses to manage various aspects of their lives. For example, many users keep track of many of their appointments, meetings and other events in a calendar program on their electronic apparatus. In addition, many users utilize map programs, navigation programs, and/or the like to assist with commuting from on location to another location. For example, a navigation program may provide a map to a user that comprises a route, instructions, and/or the like, to assist the user in finding his way to a designated location. In this manner, users have become reliant on electronic apparatuses as assistants in managing their daily affairs. In some circumstances, it may be desirable to improve the way users interact with their electronic apparatus.

SUMMARY

Various aspects of examples of the invention are set out in the claims.

One or more embodiments may provide an apparatus, a computer readable medium, a non-transitory computer readable medium, a computer program product, and a method for determining a transit timeline indicative of a commute from a start location to a destination location, and causing display of a representation of the transit timeline such that, at least part of, the transit timeline is configured to surround a center point such that time along the transit timeline is represented by an angle from the center point.

One or more embodiments may provide an apparatus, a computer readable medium, a computer program product, and a non-transitory computer readable medium having means for determining a transit timeline indicative of a commute from a start location to a destination location, and means for causing display of a representation of the transit timeline such that, at least part of, the transit timeline is configured to surround a center point such that time along the transit timeline is represented by an angle from the center point.

In at least one example embodiment, the transit timeline comprises a start location representation and a destination location representation.

In at least one example embodiment, at least one of the start location representation or the destination location representation is at least one of: a textual representation or a graphical representation.

In at least one example embodiment, the graphical representation relates to at least one of: a circle, an icon, or an image.

In at least one example embodiment, the transit timeline comprises a route designation indicator.

In at least one example embodiment, the route designation indicator relates to an indicator that represents a route designation associated with at least part of a transportation route along the commute.

In at least one example embodiment, the route designation indicator relates to at least one of: a train line, a bus line, a flight segment, or a road.

In at least one example embodiment, the route designation indicator is represented by at least one of: a color of the transit timeline, a shading pattern of the transit timeline, a textual representation of the route designation, or a graphical representation of the route designation.

In at least one example embodiment, the color of the transit timeline corresponds with a route color specified by a transportation carrier that provides transportation along the route designated by the route designation indicator.

In at least one example embodiment, the textual representation of the route designation corresponds to a route designation name that corresponds with a route name specified by a transportation carrier that provides transportation along the route designated by the route designation indicator.

One or more example embodiments further perform determining at least one route designation that signifies at least one route associated with at least part of the commute.

One or more example embodiments further perform determining the at least one route.

In at least one example embodiment, the route designation indicator is placed on the transit timeline to correspond with a time period that corresponds with at least part of the commute that utilizes a route designated by the route designation indicator.

In at least one example embodiment, the transit timeline comprises a waypoint representation.

In at least one example embodiment, the waypoint representation relates to a transportation transition point associated with the commute.

In at least one example embodiment, the waypoint representation relates to a part of the commute associated with at least one of: a route transition, a transportation carrier transition, a mode of transportation transition, or a vehicle transition.

In at least one example embodiment, the waypoint representation corresponds with at least one of: a train station along the commute, an airport along the commute, a bus station along the commute, or a road intersection along the commute.

One or more example embodiments further perform determining occurrence of a waypoint represented by the waypoint representation on the commute.

One or more example embodiments further perform determining the commute to include the waypoint.

In at least one example embodiment, the transit timeline comprises a route designation indicator that terminates at the waypoint representation.

In at least one example embodiment, the transit timeline comprises a route designation indicator that initiates at the waypoint representation.

In at least one example embodiment, the waypoint representation identifies a waypoint by way of at least one of: a color of the waypoint representation, a shading pattern of the waypoint representation, a textual representation of the waypoint representation, or a graphical representation of the waypoint representation.

In at least one example embodiment, the textual representation of the waypoint representation corresponds with at least one of: a station name, a terminal name, or an airport name.

In at least one example embodiment, the graphical representation relates to at least one of: a circle, an icon indicative of a waypoint represented by the waypoint representation, or an image indicative of the waypoint.

In at least one example embodiment, the waypoint representation is placed on the transit timeline to correspond with an arrival time at a waypoint represented by the waypoint representation.

One or more example embodiments further perform determining that the arrival time at the waypoint has changed to a different arrival time, and causing placement of the waypoint representation to correspond with the different arrival time.

In at least one example embodiment, the transit timeline comprises a landmark representation.

In at least one example embodiment, the landmark representation relates to a physically identifiable aspect associated with the commute.

In at least one example embodiment, the landmark indicates a physical reference point for a user to associate the commute to the transit timeline.

In at least one example embodiment, the landmark representation is a waypoint representation.

In at least one example embodiment, the landmark representation relates to at least one of: a train station along the commute, an airport along the commute, a bus station along the commute, a road intersection along the commute, or a point of interest.

In at least one example embodiment, the landmark representation indicates a landmark that is associated with a lack of a transportation transition point associated with the commute.

In at least one example embodiment, the lack of a transportation transition point associated with the commute relates to a route designation after the landmark representation being the same as a route designation before the landmark representation.

In at least one example embodiment, the landmark representation is placed on the transit timeline to correspond with an arrival time at a landmark represented by the landmark representation.

One or more example embodiments further perform determining that the arrival time at the landmark has changed to a different arrival time, and causing placement of the landmark representation to correspond with the different arrival time.

In at least one example embodiment, the landmark representation is placed on the transit timeline to correspond with a time at which a landmark represented by the landmark representation may be perceived by a user.

One or more example embodiments further perform determining that the time at which the landmark represented by the landmark representation may be perceived by the user has changed to a different time, and causing placement of the landmark representation to correspond with the different time.

In at least one example embodiment, the landmark representation identifies a landmark by way of at least one of: a color of the landmark representation, a shading pattern of the landmark representation, a textual representation of the landmark representation, or a graphical representation of the landmark representation.

In at least one example embodiment, the textual representation of the landmark representation corresponds with at least one of: a station name, a terminal name, or an airport name.

In at least one example embodiment, the graphical representation relates to at least one of: a circle, an icon indicative of a landmark represented by the landmark representation, or an image indicative of the landmark.

In at least one example embodiment, the transit timeline comprises a waypoint representation and at least one graphical characteristic of the waypoint representation differs from at least one graphical characteristic of the landmark representation.

In at least one example embodiment, at least one graphical characteristic of the waypoint representation differs from at least one graphical characteristic of the landmark representation by way of at least one of: color, opacity, or shape.

One or more example embodiments further perform determining occurrence of a landmark represented by the landmark representation on the commute.

One or more example embodiments further perform determining the commute to include the landmark.

In at least one example embodiment, the transit timeline comprises at least one departure indicator.

In at least one example embodiment, the departure indicator relates to a time at which a transportation vehicle associated with the commute is scheduled to depart.

In at least one example embodiment, the departure indicator relates to at least one of: a train departure, a flight departure, a bus departure, or a boat departure.

In at least one example embodiment, the departure indicator relates to a planned commute departure and the transit timeline comprises at least one alternative departure indicator.

In at least one example embodiment, the planned commute departure indicator relates to a departure upon which subsequent times of the transit timeline are based.

In at least one example embodiment, the alternative departure indicator relates to a departure upon which subsequent times of the transit timeline have not been based.

In at least one example embodiment, the departure indicator identifies a departure by way of at least one of: a color of the departure indicator, a shading pattern of the departure indicator, a textual representation of the departure indicator, or a graphical representation of the departure indicator.

In at least one example embodiment, the textual representation of the departure indicator corresponds with a textual representation of a time.

In at least one example embodiment, the graphical representation relates to at least one of: a circle, an icon indicative of a departure, a line orthogonal to the transit timeline, a line towards the center point, or an image indicative of a departure.

In at least one example embodiment, the departure indicator relates to a planned commute departure and the transit timeline comprises at least one alternative departure indicator and at least one graphical characteristic of the planned commute departure differs from at least one graphical characteristic of the alternative departure indicator.

In at least one example embodiment, at least one graphical characteristic of the planned commute departure differs from at least one graphical characteristic of the alternative departure indicator by way of at least one of: color, opacity, length, or shape.

In at least one example embodiment, the departure indicator is placed on the transit timeline to correspond with a scheduled departure time indicated by the departure indicator.

One or more example embodiments further perform determining that the scheduled departure time has changed to a different time, and causing placement of the departure indicator to correspond with the different time.

One or more example embodiments further perform determining that the commute relies on at least one departure time represented by the departure indicator.

One or more example embodiments further perform determining the commute to rely on the departure.

One or more example embodiments further perform determining that an arrival upon which a departure indicated by the departure indicator relates to a time that precludes inclusion of the departure in the commute.

In at least one example embodiment, determining that the arrival relates to a time that precludes inclusion of the departure comprises determining that the arrival is after the departure.

In at least one example embodiment, determining that the arrival relates to a time that precludes inclusion of the departure comprises determining that the arrival is within a transition threshold duration prior to the departure.

One or more example embodiments further perform causing determination of the transit timeline based, at least in part, on an alternative departure.

One or more example embodiments further perform selecting the alternative departure.

In at least one example embodiment, the alternative departure is selected based on being a next departure after the arrival.

In at least one example embodiment, the alternative departure is selected based on being a next departure after a transition threshold duration subsequent to the arrival.

In at least one example embodiment, reliance on the departure time relates to subsequent parts of the transit timeline being based, at least in part, on a commuter departing in accordance with the departure time.

In at least one example embodiment, the representation of the transit timeline is configured to surround a center point such that 1 minute along the transit timeline is represented by a 6 degree angle from the center point.

In at least one example embodiment, the representation of the transit timeline is configured to surround a center point such that 1 hour along the transit timeline is represented by a 30 degree angle from the center point.

In at least one example embodiment, the transit timeline spans a transit duration that exceeds a 360 degree representational duration.

In at least one example embodiment, the representation of the transit timeline relates to a part of the transit timeline that corresponds with a duration that is less than or equal to a duration that corresponds with a 360 degree representational duration.

In at least one example embodiment, the representation of the transit timeline comprises a preceding time indicator that indicates a duration between a part of the transit timeline and a start of the representation of the transit timeline.

In at least one example embodiment, the part of the transit timeline relates to at least one of: a start location representation, a waypoint representation, a landmark representation, or a departure representation.

In at least one example embodiment, the representation of the transit timeline comprises a subsequent time indicator that indicates a duration between a part of the transit timeline and a terminus of the representation of the transit timeline.

In at least one example embodiment, the part of the transit timeline relates to at least one of: a destination location representation, a waypoint representation, a landmark representation, or a departure representation.

In at least one example embodiment, the representation of the transit timeline is configured to be a spiral surrounding the center point.

In at least one example embodiment, the spiral is configured such that a later time on the transit timeline is represented closer to the center point than an earlier time on the transit timeline.

In at least one example embodiment, the spiral progresses toward the center point in a clockwise manner.

In at least one example embodiment, the representation of the transit timeline comprises a current time indicator.

In at least one example embodiment, the current time indicator represents a position on the transit timeline that reflects a time that corresponds with a present time.

In at least one example embodiment, the current time indicator is configured to remain at a designated position with respect to passage of time.

In at least one example embodiment, the apparatus causes the representation of the transit timeline to be rotated counterclockwise relative to the current time indicator with respect to the passage of time.

In at least one example embodiment, the representation of the transit timeline is configured to be spiral surrounding the center point, and rotation of the representation of the transit timeline corresponds to expansion of the spiral to align the current time indicator with a part of the representation of the transit timeline that corresponds with the current time indicator.

One or more example embodiments further perform determining that a time duration has elapsed, and changing the representation of the transit timeline such that representation of the transit timeline becomes rotated relative to the current time indicator with respect to the dime duration.

In at least one example embodiment, the representation of the transit timeline comprises a look-back duration that relates to a duration prior to the current time indicator, such that the representation of the transit timeline omits information prior to the look-back duration.

In at least one example embodiment, the representation of the transit timeline comprises a look-ahead duration that relates to a duration subsequent to the current time indicator, such that the representation of the transit timeline omits information subsequent to the look-ahead duration.

In at least one example embodiment, the current time indicator identifies a present time by way of at least one of: a color of the current time indicator, a shading pattern of the current time indicator, a textual representation of the current time indicator, or a graphical representation of the current time indicator.

In at least one example embodiment, the textual representation of the current time indicator corresponds with a textual representation of a present time.

In at least one example embodiment, the graphical representation relates to at least one of: a circle, an icon indicative of the present time, a line orthogonal to the transit timeline, or an image indicative of the present time.

In at least one example embodiment, causing display of the representation of the transit timeline comprises sending the representation to a receiving apparatus.

In at least one example embodiment, the time along the transit timeline is represented by a segment on the timeline associated to a correspondent angle from the center point.

BRIEF DESCRIPTION OF THE DRAWINGS

For a more complete understanding of embodiments of the invention, reference is now made to the following descriptions taken in connection with the accompanying drawings in which:

FIGS. 3A-3E are diagrams illustrating representations of transit timelines according to at least one example embodiment;

FIGS. 5A-5C are diagrams illustrating representations of transit timelines according to at least one example embodiment;

FIGS. 6A-6B are diagrams illustrating representations of transit timelines according to at least one example embodiment;

DETAILED DESCRIPTION OF THE DRAWINGS

Figure 1:
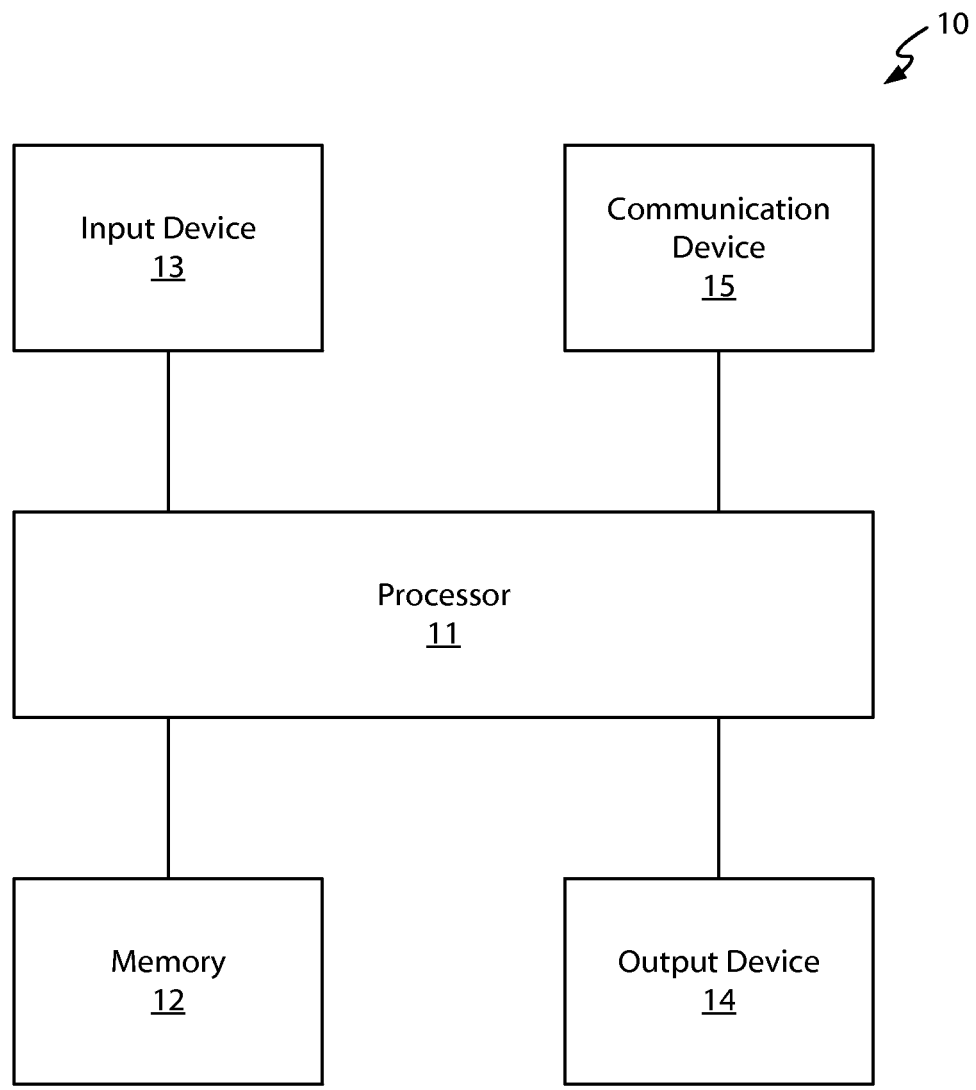
FIG. 1 is a block diagram showing an apparatus, such as an electronic apparatus 10, according to an example embodiment.

An embodiment of the invention and its potential advantages are understood by referring to FIGS. 1 through 12 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

FIGS. 2A-2D are diagrams illustrating transit timelines indicative of commutes according to at least one example embodiment. The examples of FIGS. 2A-2D are merely examples of transit timelines indicative of commutes, and do not limit the scope of the claims. For example, representation of one or more parts of the timeline may vary, correlation between a map and the timeline may vary, proportionality of the timeline may vary, and/or the like.

As previously described, users have become reliant on electronic apparatuses for managing their daily activities. For example, many users rely on navigation programs for assisting in making navigation decisions during a commute, understanding their current status along a commute, estimating an arrival time at a destination, estimating amount of time until the user may desire to make a navigation decision, and/or the like.

In some circumstances, a user may be commuting from a location to another location without concern for geographic information, such as a geographic map. For example, the user may not be commuting in a capacity that would directly benefit from understanding geographic information. For example, the user may be a passenger. In another example, the user may be a driver, but may be focused on navigational transition points instead of geographic location. In such an example, the user may elect to focus on performing driving instructions without necessarily being concerned about tracking geographic location. In such circumstances, it may be desirable to provide a user with a transit timeline that is absent a geographical representation.

In at least one example embodiment, a transit timeline relates to a graphical representation illustrating a commute in relation to time. In at least one example embodiment, the transit timeline is absent a representation of geographic location, such as a map representation. Without limiting the scope of the claims in any way, at least one technical effect associated with the transit timeline being absent a map representation may be to simplify the information to be assimilated by the user, to provide a smaller representation of the commute, or to reduce the amount of a display consumed by a graphical representation of a commute.

In at least one example embodiment, an apparatus determines a transit timeline indicative of a commute from a start location to a destination location. The start location may relate to a location from which the commute begins. The destination location may relate to a location at which the commute terminates. The transit timeline may be indicative of the commute by illustrating a relationship between one or more time involved in the commute in relation to the start location, the destination location, or any other notable part of the commute. In this manner, the transit timeline represents time along the transit timeline. For example, the user may be able to perceive a time between two parts of the commute based, at least in part, on their position along the transit timeline. For example, a transit timeline that is arranged in a straight line may indicate distance bay way of a continuous linear progression of time along the transit timeline. In such a transit timeline, a user may be able to understand a time between two parts of a commute by the distance between the parts of the commute along the transit timeline.

In at least one example embodiment, a commute relates to a set of navigation activities. For example, a navigation activity may relate to travelling on a route, changing from a route to a different route, boarding a vehicle, exiting a vehicle, entering a station, and/or the like. In at least one example embodiment, the apparatus determines a commute. The apparatus may determine the commute based, at least in part, on map information, travel plan information, schedule information, and/or the like. For example, the commute may be based, at least in part, on one or more train schedules.

In at least one example embodiment, the transit timeline comprises a start location representation and a destination location representation. In at least one example embodiment, the start location representation is indicative of a beginning of the commute. In at least one example embodiment, the destination location representation is indicative of a termination of the commute. The start location representation and/or the destination location representation may be a textual representation, a graphical representation, and/or the like. In at least one example embodiment, a textual representation relates to text positioned on the timeline to be is indicative of the location, signify that the location is a start location, signify that a location is a destination location, identify a name associated with the location, and/or the like. In at least one example embodiment, a graphical representation relates to a non-textual visual representation that demarks the location on the timeline, such as a circle, an icon, an image, and/or the like.

In at least one example embodiment, the transit timeline comprises a route designation indicator. In at least one example embodiment, the route designation indicator relates to an indicator that represents a route designation associated with at least part of a transportation route along the commute. A route designation may relate to a train line to be travelled upon, a bus line to be travelled upon, a flight segment to be travelled upon, a road to be travelled upon, and/or the like. For example, if the commute includes travel on a first flight and travel on second flight, the transit timeline may comprise a route designation indicator that is indicative of the first flight and a route designation indicator that is indicative of the second flight.

In at least one example embodiment, the route designation indicator is represented by a color of the transit timeline, a shading pattern of the transit timeline, a textual representation of the route designation, a graphical representation of the route designation. For example, the color of the transit timeline may correspond with a route color specified by a transportation carrier that provides transportation along the route designated by the route designation indicator. For example, a train line may be designated as the blue line. In such an example, the route designation indicator may be blue. In at least one example embodiment, the textual representation of the route designation corresponds to a route designation name that corresponds with a route name specified by a transportation carrier that provides transportation along the route designated by the route designation indicator. For example, a flight may be designated by a flight number. In such an example, the textual representation of the route designation may relate to a textual representation of the flight number.

In at least one example embodiment, the route designation indicator is placed on the transit timeline to correspond with a time period that corresponds with at least part of the commute that utilizes a route designated by the route designation indicator. For example, the route designation indicator may be placed on the transit timeline such that the route designation indicator initiates at a time along the transit timeline that corresponds with the commute involving travel along the route designated by the route designation indicator. In another example, the route designation indicator may be placed on the transit timeline such that the route designation indicator terminates at a time along the transit timeline that corresponds with the commute involving travel along the route designated by the route designation indicator. In this manner, the user may be able to understand transit time associated with the route indicated by the route designation indicator based, at least in part, on a time along the transit timeline at which the route designation indicator initiates and a time along the transit timeline at which the route designation indicator terminates.

In at least one example embodiment, the apparatus determines at least one route designation that signifies at least one route associated with at least part of the commute. For example, the apparatus may determine the commute to include the route designated by the route designation indicator. In such an example, the apparatus may determine the route.

In at least one example embodiment, the transit timeline comprises a waypoint representation. In at least one example embodiment, a waypoint representation relates to a representation that is indicative of a waypoint. In at least one example embodiment, a waypoint relates to a transportation transition point associated with the commute. In at least one example embodiment, a transportation transition point relates to a part of the commute associated with a route transition, a transportation carrier transition, a mode of transportation transition, or a vehicle transition. For example, a waypoint may relate to a transition from a route to a different route, a transition from a carrier to a different carrier, a transition from a mode of transportation to a different mode of transportation, a transition from a vehicle to a different vehicle, and/or the like. In at least one example embodiment, the waypoint representation may be indicative of a location at with a transportation transition point occurs in the commute. For example, the waypoint representation may correspond with a train station along the commute, an airport along the commute, a bus station along the commute, or a road intersection along the commute.

In at least one example embodiment, a waypoint indicator signifies termination of a route designation indicator, initiation of a route designation indicator, and/or the like. For example, the transit timeline may comprise a route designation indicator that terminates at the waypoint representation. In another example, the transit timeline may comprise a route designation indicator that initiates at the waypoint representation. In at least one example embodiment the waypoint representation is placed on the transit timeline to correspond with an arrival time at a waypoint represented by the waypoint representation. For example, if the waypoint representation relates to a transition from a train line to a different train line at a terminal, the waypoint representation may be placed on the transit timeline to correspond with an arrival time at the terminal.

In at least one example embodiment, the waypoint representation identifies a waypoint by way of a color of the waypoint representation, a shading pattern of the waypoint representation, a textual representation of the waypoint representation, a graphical representation of the waypoint representation, and/or the like. For example, the waypoint representation may be discernible from the route designation indicator and/or other elements of the transit timeline, by way of a color of the waypoint representation, a shading pattern of the waypoint representation, a textual representation of the waypoint representation, a graphical representation of the waypoint representation, and/or the like. In at least one example, embodiment, the textual representation of the waypoint representation corresponds with a station name, a terminal name, an airport name, and/or the like. For example, if the waypoint representation corresponds with a terminal at which the commute comprises a transition from a train line to a different train line, the textual representation may be a textual representation of the terminal name. In at least one example embodiment, the graphical representation of the waypoint representation relates to a circle, an icon indicative of a waypoint represented by the waypoint representation, an image indicative of the waypoint, and/or the like.

In at least one example embodiment, the apparatus determines occurrence of a waypoint represented by the waypoint representation on the commute. For example, the apparatus may determine the commute to include a transition between routes. In at least one example embodiment, the apparatus determines the commute to include the waypoint.

In at least one example embodiment, the apparatus determines that the arrival time at the waypoint has changed to a different arrival time. For example, there may be a delay in travelling to the waypoint, a departure time associated with one or more routes in the commute prior to the arrival time may be delayed, and/or the like. In such an example, the apparatus may cause placement of the waypoint representation to correspond with the different arrival time. For example, the different arrival time may correspond with an arrival time that takes a delay into account.

In at least one example embodiment, the transit timeline comprises a landmark representation. In at least one example embodiment, the landmark representation relates to a physically identifiable aspect associated with the commute. For example, the landmark representation may be a waypoint representation, such as a train station along the commute, an airport along the commute, a bus station along the commute, a road intersection along the commute, and/or the like, or a point of interest. In another example, the landmark representation may be unassociated with a waypoint representation. In such an example, the landmark representation may indicate a landmark that is associated with a lack of a transportation transition point associated with the commute. In at least one example embodiment, the lack of a transportation transition point associated with the commute relates to a route designation after the landmark representation being the same as a route designation before the landmark representation. In at least one example embodiment, the landmark representation indicates a physical reference point for a user to associate the commute to the transit timeline. For example, the landmark may relate to a point of interest, such as a monument, a park, a building, and/or the like. In at least one example embodiment, the landmark representation is placed on the transit timeline to correspond with an arrival time at a landmark represented by the landmark representation, a time at which the landmark represented by the landmark representation may be perceived by a user, and/or the like.

In at least one example embodiment, the landmark representation identifies a landmark by way of a color of the landmark representation, a shading pattern of the landmark representation, a textual representation of the landmark representation, or a graphical representation of the landmark representation. In at least one example embodiment, the textual representation of the landmark representation corresponds with at least one of: a station name, a terminal name, an airport name, a point of interest name, and/or the like. In at least one example embodiment the graphical representation relates to a circle, an icon indicative of a landmark represented by the landmark representation, an image indicative of the landmark, and/or the like. In some circumstances, it may be desirable to differentiate a landmark representation that is not associated with a waypoint from a waypoint representation. For example, if the transit timeline comprises a landmark representation unassociated with a waypoint and a waypoint representation, at least one graphical characteristic of the waypoint representation may differ from at least one graphical characteristic of the landmark representation. For example, at least one graphical characteristic of the waypoint representation may differ from at least one graphical characteristic of the landmark representation by way of color, opacity, shape, size, fill pattern, brightness, and/or the like.

In at least one example embodiment, the apparatus determines that an arrival time at the landmark has changed to a different arrival time. For example, there may be a delay in travelling to the landmark, a departure time associated with one or more routes in the commute prior to the arrival time may be delayed, and/or the like. In such an example, the apparatus may cause placement of the landmark representation to correspond with the different arrival time. For example, the different arrival time may correspond with an arrival time that takes a delay into account.

In at least one example embodiment, the apparatus determines that that a time at which the landmark represented by the landmark representation may be perceived by the user has changed to a different time. For example, there may be a delay in travelling to the landmark, a departure time associated with one or more routes in the commute prior to the arrival time may be delayed, and/or the like. In such an example, the apparatus may cause placement of the landmark representation to correspond with the different time. For example, the different time may correspond with an arrival time that takes a delay into account.

In at least one example embodiment, the apparatus determines occurrence of a landmark represented by the landmark representation on the commute. For example, the apparatus may determine the commute to include the landmark, to allow the user to perceive the landmark, and/or the like. In at least one example embodiment, the apparatus determines the commute to include the landmark.

Figure 2A:
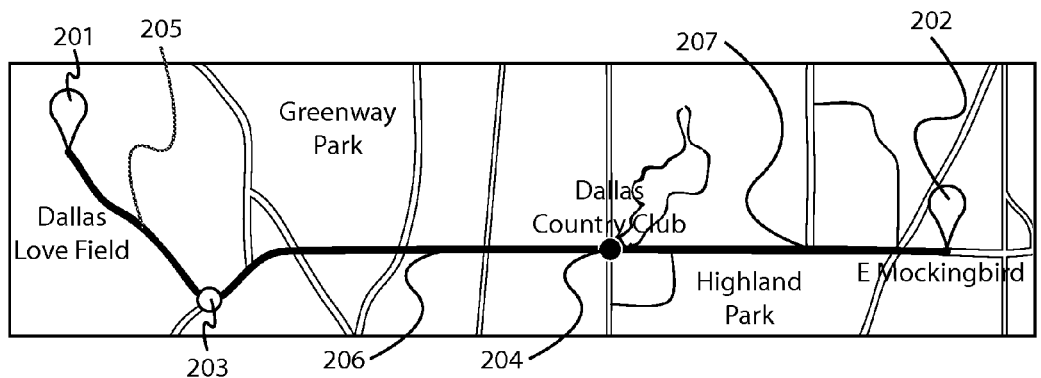
FIGS. 2A-2D are diagrams illustrating transit timelines indicative of commutes according to at least one example embodiment.
Figure 2B:
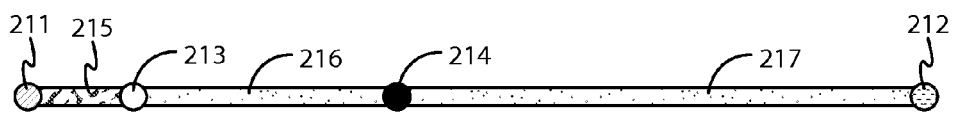

FIG. 2B is a diagram illustrating a transit timeline indicative of a commute illustrated by FIG. 2A, according to at least one example embodiment.

FIG. 2A illustrates a commute between start location 201, which may correspond with Dallas Love Field airport, and destination location 202, which may correspond with Mockingbird Train Station. It can be seen that the commute of FIG. 2A comprises waypoint 203, and landmark 204. Waypoint 203 relates to a transition between route 205, which may corresponds to the exit of Dallas Love Field airport, and route 206, which may correspond with East Mockingbird road. It can be seen that landmark 204 corresponds with Dallas Country Club along the route between waypoint 203 and destination location 202 such that route 206 represents the route along East Mockingbird road between waypoint 203 and landmark 204, an route 207 represents the route along East Mockingbird road between landmark 204 and destination location 202.

FIG. 2B illustrates an example of a transit timeline that may be based, at least in part, on the commute of FIG. 2A. In the example of FIG. 2B, start location representation 211 represents start location 201 and destination location representation 212 represents destination location 202. It can be seen that the fill pattern of start location representation 211 differs from the fill pattern of destination location indicator 212. In the example of FIG. 2B, waypoint representation 213 represents waypoint 203. It can be seen that the fill pattern of waypoint representation 213 differs from the fill pattern of start location representation 211 and the fill pattern of destination location indicator 212. In the example of FIG. 2B, landmark representation 214 represents landmark 204. It can be seen that the fill pattern of landmark representation 214 differs from the fill pattern of waypoint representation 213, the fill pattern of start location representation 211, and the fill pattern of destination location indicator 212. In this manner, the user may recognize that there is a transportation transition associated with waypoint representation 213, and no transportation transition associated with landmark representation 214.

In the example of FIG. 2B, route designation indicator 215 represents route 205 such that the length of route designation indicator 215 represents commute time along route 205. In the example of FIG. 2B, route designation indicator 216 represents route 206 such that the length of route designation indicator 216 represents commute time along route 206. In the example of FIG. 2B, route designation indicator 217 represents route 207 such that the length of route designation indicator 217 represents commute time along route 207. It can be seen that the fill pattern of route designation indicator 216 reflects the fill pattern of route designation indicator 217. In at least one example embodiment, this commonality of fill pattern may indicate that route designation indicators 216 and 217 relate to routes that are along the same transportation route, such as the same road. It can be seen that, even though the length of route 206 is similar to the length of route 207, route designation indicator 217 is approximately twice as long as route designation indicator 216. This difference in length may be indicative of a commute time along route 207 that is associated with approximately twice the commute time of travel along route 206. It can be seen that the fill pattern of route designation indicators 216 and 217 differs from the fill pattern of route designation indicator 215.

Figure 2C:
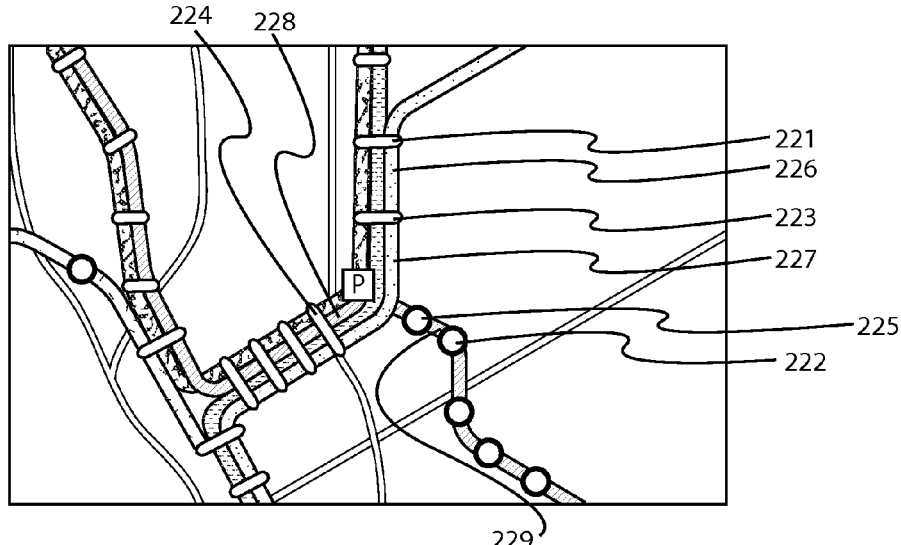
Figure 2D:
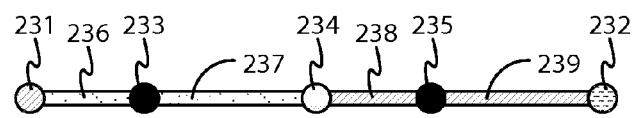

FIG. 2D is a diagram illustrating a transit timeline indicative of a commute illustrated by FIG. 2C, according to at least one example embodiment. FIG. 2C illustrates a commute between start location 221, which may correspond with a train terminal, and destination location 222, which may correspond with another train terminal. In the example of FIG. 2C, the commute progresses by way of routes 226 and 227 with correspond with the same train line. In the example of FIG. 2C, landmark 223 corresponds with a train terminal between routes 226 and 227. Landmark 223 is not a waypoint for, at least, the reason that the user passes through the train terminal without any transition to another route, to another carrier, and/or the like. At waypoint 224, the commute comprises a transition from the train line associated with routes 226 and 227 to the train route associated with routes 228 and 229. In the example of FIG. 2C, landmark 225 corresponds with a train terminal between routes 228 and 229. Landmark 225 is not a waypoint for, at least, the reason that the user passes through the train terminal without any transition to another route, to another carrier, and/or the like.

FIG. 2D illustrates an example of a transit timeline that may be based, at least in part, on the commute of FIG. 2C. In the example of FIG. 2D, start location representation 231 represents start location 221 and destination location representation 232 represents destination location 222. It can be seen that the fill pattern of start location representation 231 differs from the fill pattern of destination location indicator 232. In the example of FIG. 2D, landmark representation 233 represents landmark 223. It can be seen that the fill pattern of landmark representation 233 differs from the fill pattern of start location representation 231 and the fill pattern of destination location indicator 232. In the example of FIG. 2D, waypoint representation 234 represents waypoint 224. It can be seen that the fill pattern of waypoint representation 234 differs from the fill pattern of start location representation 231, the fill pattern of landmark representation 233, and the fill pattern of destination location indicator 232. In this manner, the user may recognize that there is a transportation transition associated with waypoint representation 234, and no transportation transition associated with landmark representation 233. In the example of FIG. 2D, landmark representation 235 represents landmark 225. It can be seen that the fill pattern of landmark representation 235 differs from the fill pattern of waypoint representation 234, the fill pattern of start location representation 231, and the fill pattern of destination location indicator 232.

In the example of FIG. 2D, route designation indicator 236 represents route 226 such that the length of route designation indicator 236 represents commute time along route 226. In the example of FIG. 2D, route designation indicator 237 represents route 227 such that the length of route designation indicator 237 represents commute time along route 227. In the example of FIG. 2D, route designation indicator 238 represents route 228 such that the length of route designation indicator 238 represents commute time along route 228. In the example of FIG. 2D, route designation indicator 239 represents route 229 such that the length of route designation indicator 239 represents commute time along route 229. It can be seen that the fill pattern of route designation indicator 236 reflects the fill pattern of route designation indicator 237. In at least one example embodiment, this commonality of fill pattern may indicate that route designation indicators 236 and 237 relate to routes that are along the same transportation route, such as the same train line. It can be seen that the fill pattern of route designation indicator 238 reflects the fill pattern of route designation indicator 239. In at least one example embodiment, this commonality of fill pattern may indicate that route designation indicators 238 and 239 relate to routes that are along the same transportation route, such as the same train line. It can be seen that, even though the length of route 229 is shorter than the length of route 228, route designation indicator 229 is approximately twice as long as route designation indicator 228. This difference in length may be indicative of a commute time along route 229 that is associated with approximately twice the commute time of travel along route 228. It can be seen that the fill pattern of route designation indicators 236 and 237 differs from the fill pattern of route designation indicators 238 and 239.

FIGS. 3A-3E are diagrams illustrating representations of transit timelines according to at least one example embodiment. The examples of FIGS. 3A-3E are merely examples of transit timelines, and do not limit the scope of the claims. For example, orientation of the representation may vary, shape of the representation may vary, proportionality of the representation may vary, and/or the like.

In some circumstance, it may be desirable to provide for a timeline representation that encompasses less linear space than the example of FIGS. 2B and 2D. For example, it may be desirable for a representation of a transit timeline to be associated with a corner of a display.

In some circumstances, it may be desirable to provide a representation of the transit timeline that allows the user to quickly and intuitively identify a time span along the representation of the transit timeline. For example, in some circumstances, a user may have difficulty identifying a time span associated with a representation of a transit timeline that relates to a straight line. For example, there may be various scaling factors applied to the transit timeline that may vary the time represented by the distance of the transit timeline. It may be desirable to provide a representation of the transit timeline that indicates time in relation to a paradigm in that is intuitive to a user. In this manner, such a transit timeline representation may reduce the amount of time associated with a user contemplating the transit timeline representation to achieve understanding. In some circumstances, where such contemplation may be associated with the user being distracted from activities around the user, such an intuitive transit timeline representation may increase user safety associated with understanding the transit timeline.

In at least one example embodiment, the representation of the transit timeline relates to a temporal representation that allows the user to perceive time along the transit timeline in accordance with the user's familiarity with an analog clock. In at least one example embodiment, the transit timeline is configured to surround a center point such that time along the transit timeline is represented by an angle from the center point. In at least one example embodiment, the center point relates to a center point in relation to the configuration of the transit timeline without regard for a center point of other displayed information. For example, the center point may relate to a geometric center of a shape that the transit timeline, at least partially circumscribes, such as a focal point. In such an example, the center point may not necessarily relate to the center of any other displayed information, or may correspond with the center of other displayed information by way of coincidence, as opposed to determination to provide such a relationship. In at least one example embodiment, the representation of the transit timeline is configured to surround a center point such that one minute along the transit timeline is represented by a six degree angle from the center point. In this manner, three hundred sixty degrees along such a transit timeline may be indicative of one hour. In at least one example embodiment, the representation of the transit timeline is configured to surround a center point such that one hour along the transit timeline is represented by a thirty degree angle from the center point. In this manner, three hundred sixty degrees along such a transit timeline may be indicative of twelve hours.

In at least one example embodiment, the apparatus causes display of the representation of the transit timeline. The apparatus may cause display by displaying the representation of the transit timeline, sending information indicative of the transit timeline to a different apparatus, which displays the representation of the transit timeline, and/or the like. For example, causing display of the representation of the transit timeline may comprise sending the representation to a receiving apparatus.

FIG. 3A is a diagram illustrating a representation of a transit timeline according to at least one example embodiment. In the example of FIG. 3A, the representation of the transit timeline partially circumscribes a circle around center point 304. The transit timeline of FIG. 3A comprises start location representation 302, route designation indicator 301, and destination location representation 303. In the example of FIG. 3A, the representation of the transit timeline is configured such that time along the transit timeline is represented by an angle from center point 304. For example, angle 305 may indicate a time duration along the transit timeline. In at least one example embodiment, the time along the transit timeline is represented by a segment on the timeline associated to a correspondent angle from the center point. In the example of FIG. 3A, the length of the segment may be similar for a given angle at various parts of the representation of the transit timeline. For example, the circular shape of the representation of the transit timeline of FIG. 3A may allow for a similar length of the segment indicated by angle 305 regardless of the orientation of angle 305.

FIG. 3B is a diagram illustrating a representation of a transit timeline according to at least one example embodiment. In the example of FIG. 3B, the representation of the transit timeline partially circumscribes a rectangle around center point 314. It can be seen that the representation of the transit timeline of FIG. 3B comprises start location representation 312, route designation indicator 311, and destination location representation 313. In the example of FIG. 3B, the representation of the transit timeline is configured such that time along the transit timeline is represented by an angle from center point 314. For example, angle 315 may indicate a time duration along the transit timeline. In at least one example embodiment, the time along the transit timeline is represented by a segment on the timeline associated to a correspondent angle from the center point. Depending on the shape of the representation of the transit timeline, the distance along such segment reflected by a change in angle may vary. In the example of FIG. 3B, the length of the segment may vary for a given angle at various parts of the representation of the transit timeline depending upon the orientation of the angle. For example, the rectangular shape of the representation of the transit timeline of FIG. 3B may allow for a varying length of the segment indicated by angle 315 in the orientation shown in FIG. 3B and a segment indicated by angle 315 at an orientation that is rotated forty five degrees from the orientation of angle 315 in FIG. 3B.

FIG. 3C is a diagram illustrating a representation of a transit timeline according to at least one example embodiment. In some circumstances, it may be desirable for the user to perceive where the current time of the commute is represented on the transit timeline. In at least one example embodiment, the representation of the transit timeline comprises a current time indicator. In at least one example embodiment, the current time indicator represents a position on the transit timeline that reflects a time that corresponds with a present time. In this manner, a user may be able to relate the user's current position with the current time on the transit timeline. For example, if the current time indicator aligns with a landmark representation, the user may be able to identify that the user may currently be at the landmark associated with the landmark representation. The current time indicator may identifies a present time by way of a color of the current time indicator, a shading pattern of the current time indicator, a textual representation of the current time indicator, a graphical representation of the current time indicator. For example, the textual representation of the current time indicator may corresponds with a textual representation of a present time, such as a numerical representation of time. In another example, the graphical representation relates to a circle, an icon indicative of the present time, a line orthogonal to the transit timeline, an image indicative of the present time, and/ or the like.

In the example of FIG. 3C, the representation of the transit timeline comprises start location representation 321, route designation indicator 325, waypoint representation 323, route designation indicator 326, landmark representation 324, route designation indicator 327, and destination location representation 322. It can be seen that current time indicator 328 relates to a time at which the commute corresponds with the start location.

FIG. 3C may be a representation of the transit timeline of FIG. 2B such that, at least part of, the transit timeline is configured to surround a center point such that time along the transit timeline is represented by an angle from the center point. In the example of FIG. 3C, start location representation 321 may relate to start location representation 211 of FIG. 2B and destination location representation 322 may relate to destination location representation 212 of FIG. 2B. In the example of FIG. 3C, waypoint representation 323 may relate to waypoint representation 213 of FIG. 2B. In the example of FIG. 3C, landmark representation 324 may relate to landmark representation 214 of FIG. 2B.

FIG. 3D is a diagram illustrating a representation of a transit timeline according to at least one example embodiment. In at least one example embodiment, the current time indicator is configured to remain at a designated position with respect to passage of time. For example, even though the current time indicator may be moved in association with other operations, such as a movement of the representation of the transit timeline from one position on a display to another position on a display, the current time indicator may remain in the designated position with respect to the passage of time. In at least one example embodiment, the apparatus causes the representation of the transit timeline to be rotated counterclockwise relative to the current time indicator with respect to the passage of time. For example, the apparatus may determine that a time duration has elapsed and may change the representation of the transit timeline such that the representation of the transit timeline becomes rotated relative to the current time indicator with respect to the dime duration. The angle of such rotation may be in proportion to the relation between the angle indicative of the amount of time that has elapsed.

The example of FIG. 3D relates to the representation of the transit timeline of FIG. 3C after which the current time has progressed to a time that corresponds with the commute being along the route indicate by route designation indicator 326. It can be seen that the current time indicator has remained at its designated position with respect to passage of time and that the representation of the transit timeline has become rotated relative to the current time indicator with respect to the dime duration.

FIG. 3E is a diagram illustrating a representation of a transit timeline according to at least one example embodiment. In at least one example embodiment, the representation of the transit timeline is configured to remain at a designated orientation with respect to passage of time. For example, even though the representation of the transit timeline may be reoriented in association with other operations, such as a change in orientation of the representation of the transit timeline from portrait to landscape, the representation of the transit timeline may remain in the designated orientation with respect to the passage of time. In at least one example embodiment, the apparatus causes the current time indicator to be moved clockwise along the representation of the transit timeline with respect to an angle indicative of the passage of time. For example, the apparatus may determine that a time duration has elapsed and may change the position of the current time indicator such that the current time indicator becomes moved relative to the representation of the transit timeline with respect to the time duration.

The example of FIG. 3E relates to the representation of the transit timeline of FIG. 3C after which the current time has progressed to a time that corresponds with the commute being along the route indicate by route designation indicator 326. It can be seen that the current time indicator has become moved relative to the representation of the transit timeline with respect to the dime duration and that the representation of the transit timeline has remained at the designated orientation with respect to passage of time.

Figure 4A:
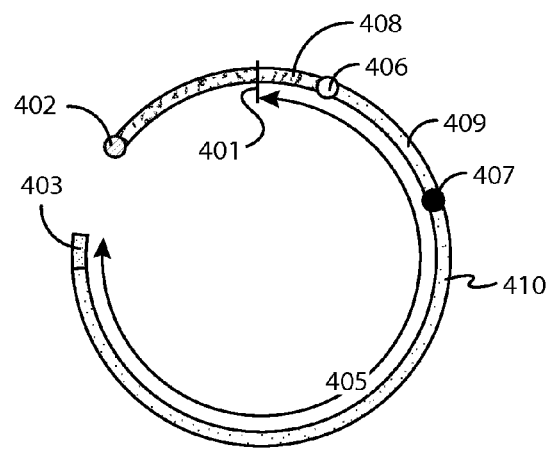
FIGS. 4A-4C are diagrams illustrating representations of transit timelines according to at least one example embodiment.
Figure 4B:
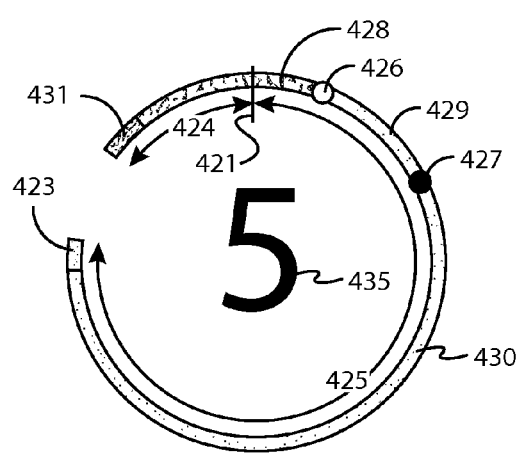
Figure 4C:
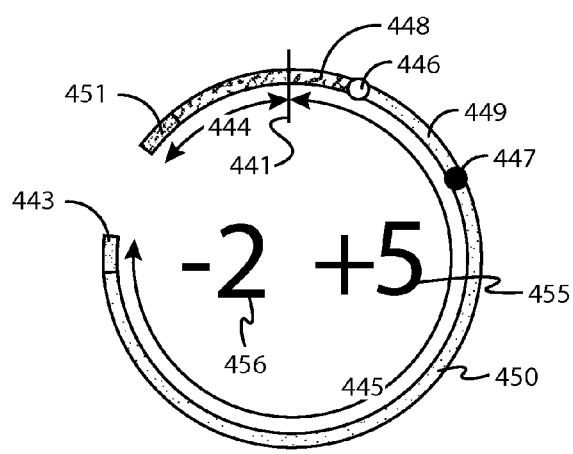

FIGS. 4A-4C are diagrams illustrating representations of transit timelines according to at least one example embodiment. The examples of FIGS. 4A-4C are merely examples of representations of transit timelines, and do not limit the scope of the claims. For example, orientation of the representation may vary, shape of the representation may vary, proportionality of the representation may vary, and/or the like.

In some circumstances, it may be desirable for the representation of the transit timeline to omit, at least part of the transit timeline, For example, the transit timeline may span a transit duration that exceeds a 360 degree representational duration. The transit duration may relate to a duration along the commute. The representational duration may relate to a duration along a representation of a transit timeline as indicated by an angle. In at least one example embodiment, the representation of the transit timeline relates to a part of the transit timeline that corresponds with a duration that is less than or equal to a duration that corresponds with a 360 degree representational duration.

FIG. 4A is a diagram illustrating a representation of a transit timeline according to at least one example embodiment. In some circumstances, it may be desirable to limit a duration beyond the current time that is indicated by the representation of the transit timeline. For example, it may be desirable to limit the duration beyond the current time so that the a time associated with a duration corresponding to a three hundred sixty degree change from the current time indicator does not occlude the current time indicator.

In at least one example embodiment, the representation of the transit timeline comprises a look-ahead duration. In at least one example embodiment, the look-ahead duration relates to a duration subsequent to the current time indicator, such that the representation of the transit timeline omits information subsequent to the look-ahead duration. In at least one example embodiment, the representation of the transit timeline comprises a look-back duration. In at least one example embodiment, the look-back duration relates to a duration prior to the current time indicator, such that the representation of the transit timeline omits information prior to the look-back duration. In at least one example embodiment, the representation of the transit timeline comprises a truncation indicator. In at least one example embodiment, a truncation indicator is indicative of the transit timeline extending beyond the representation of the transit timeline. The truncation indicator may be a graphical indication, such as a change in opacity of the transit timeline, a change in brightness of the transit timeline, a graphical representation of an unrepresented continuation, and/or the like.

The example of FIG. 4A illustrates a representation of a transit timeline comprising start location representation 402, current time indicator 401, route designation indicator 408, waypoint representation 406, route designation indicator 409, landmark representation 407, route designation indicator 410, and truncation indicator 403. It can be seen that truncation indicator 403 indicates that there is a part of the transit timeline that is absent from the representation of the transit timeline beyond look-ahead duration 405.

FIG. 4B is a diagram illustrating a representation of a transit timeline according to at least one example embodiment. In some circumstances, it may be desirable to indicate a duration before or after a truncation indicator that may be present on a transit timeline, but omitted from the representation of the transit timeline. In this manner, the user may be able to understand the timespan of the transit timeline while being able to perceive the details of the representation of the transit timeline.

In at least one example embodiment, the representation of the transit timeline comprises a preceding time indicator. The preceding time indicator may indicate a duration between a part of the transit timeline and a start of the representation of the transit timeline. For example, such part of the transit timeline may relate to a start location representation, a waypoint representation, a landmark representation, a departure representation, a truncation indicator, and/or the like.

In at least one example embodiment, the representation of the transit timeline comprises a subsequent time indicator. The subsequent time indicator may indicate a duration between a part of the transit timeline and a terminus of the representation of the transit timeline. For example, such part of the transit timeline may relate to a destination location representation, a waypoint representation, a landmark representation, a departure representation, a truncation indicator, and/or the like.

The example of FIG. 4B illustrates a representation of a transit timeline comprising truncation indicator 431, current time indicator 421, route designation indicator 428, waypoint representation 426, route designation indicator 429, landmark representation 427, route designation indicator 430, and truncation indicator 423. It can be seen that truncation indicator 431 indicates that there is a part of the transit timeline that is absent from the representation of the transit timeline prior to look-back duration 424. It can be seen that truncation indicator 423 indicates that there is a part of the transit timeline that is absent from the representation of the transit timeline beyond look-ahead duration 425.

It can be seen that time indicator 435 indicates a time duration of five, which may relate to five minutes, five hours, or any other time unit of measure. In at least one example embodiment, time indicator 435 is a subsequent time indicator indicative of a duration subsequent to a represented part of the transit timeline. In at least one example embodiment, time indicator 435 is a preceding time indicator indicative of a duration prior to a represented part of the transit timeline.

FIG. 4C is a diagram illustrating a representation of a transit timeline according to at least one example embodiment. The example of FIG. 4C illustrates a representation of a transit timeline comprising truncation indicator 451, current time indicator 441, route designation indicator 448, waypoint representation 446, route designation indicator 449, landmark representation 447, route designation indicator 450, and truncation indicator 443. It can be seen that truncation indicator 451 indicates that there is a part of the transit timeline that is absent from the representation of the transit timeline prior to look-back duration 444. It can be seen that truncation indicator 443 indicates that there is a part of the transit timeline that is absent from the representation of the transit timeline beyond look-ahead duration 445.

It can be seen that subsequent time indicator 455 indicates a time duration of five, which may relate to five minutes, five hours, or any other time unit of measure. It can be seen that preceding time indicator 456 indicates a time duration of two, which may relate to two minutes, two hours, or any other time unit of measure.

FIGS. 5A-5C are diagrams illustrating representations of transit timelines according to at least one example embodiment. The examples of FIGS. 5A-5C are merely examples of representations of transit timelines, and do not limit the scope of the claims. For example, orientation of the representation may vary, shape of the representation may vary, proportionality of the representation may vary, and/or the like. Even though the examples of FIGS. 5A-5C do not include some of the elements of FIGS. 2A-2D, FIGS. 3A-3E, and FIGS. 4A-4C, other examples that correspond with the examples of FIGS. 5A-5C may comprise such elements and/or other elements.

In some circumstances, it may be desirable to provide a representation of a transit timeline that spans a transit duration that exceeds a three hundred sixty degree representational duration. In at least one example embodiment, a representation of the transit timeline is configured to be a spiral surrounding the center point. In at least one example embodiment, the spiral is configured such that a later time on the transit timeline is represented closer to the center point than an earlier time on the transit timeline. In at least one example embodiment, the spiral progresses toward the center point in a clockwise manner.

FIG. 5A is a diagram illustrating a representation of a transit timeline according to at least one example embodiment. The representation of the transit timeline of FIG. 5A relates to a spiral representation of the transit timeline comprising start location representation 501, route designation indicator 504 and destination location representation 502 in relation to current time indicator 503. It can be seen that destination location indicator 502 corresponds with a time that is beyond a representational time associated with five hundred forty degrees subsequent to current time indicator 503.

FIG. 5B is a diagram illustrating a representation of a transit timeline according to at least one example embodiment. A spiral representation of a transit timeline may indicate elapse of time similarly to other representations of transit timelines, such as the examples of FIGS. 3D, 3E, and/or the like. The example of FIG. 5B indicates the representation of the transit timeline of FIG. 5A after elapse of time. It can be seen that the representation of the transit timeline has become rotated relative to current time indicator 503 with respect to the dime duration. It can be seen that destination location indicator 502 corresponds with a time that is within a representational time associated with five hundred forty degrees subsequent to current time indicator 503.

FIG. 5C is a diagram illustrating a representation of a transit timeline according to at least one example embodiment. Even though the spiral representation of the transit timeline may span a duration beyond a three hundred sixty degree durational representation, in some circumstances, it may be desirable to omit part of a transit timeline in a spiral representation of the transit timeline. In the example of FIG. 5C, spiral representation of transit timeline comprises truncation indicators 521 and 522 and current time indicator 523 positioned along route designation indicator 524.

In some circumstances, it may be desirable to retain proportionality of the spiral representation of the transit timeline in relation to the current time indicator as time elapses. In at least one example embodiment, rotation of the spiral representation of the transit timeline corresponds to expansion of the spiral to align the current time indicator with a part of the representation of the transit timeline that corresponds with the current time indicator. For example, the apparatus may causes rotation of elements comprised by the spiral representation of the transit timeline to be moved counter-clockwise along the contour of the spiral relative to the current time indicator with respect to the passage of time.

FIGS. 6A-6B are diagrams illustrating representations of transit timelines according to at least one example embodiment. The examples of FIGS. 6A-6B are merely examples of representations of transit timelines, and do not limit the scope of the claims. For example, orientation of the representation may vary, shape of the representation may vary, proportionality of the representation may vary, and/or the like.

In at least one example embodiment, the transit timeline comprises at least one departure indicator. The departure indicator may relate to a time at which a transportation vehicle associated with the commute is scheduled to depart. For example, the departure indicator may relate to a train departure, a flight departure, a bus departure, or a boat departure. In at least one example embodiment, the departure indicator relates to a planned commute departure or an alternative departure indicator. A planned commute departure indicator may relate to a departure upon which subsequent times of the transit timeline are based. An alternative departure indicator may relate to a departure upon which subsequent times of the transit timeline have not been based.

A departure indicator may identify a departure by way of a color of the departure indicator, a shading pattern of the departure indicator, a textual representation of the departure indicator, a graphical representation of the departure indicator, and/or the like. The textual representation of the departure indicator may correspond with a textual representation of a time. The graphical representation may relate to a circle, an icon indicative of a departure, a line orthogonal to the transit timeline, a line towards the center point, an image indicative of a departure, and/or the like. In at least one example embodiment, the departure indicator is placed on the transit timeline to correspond with a scheduled departure time indicated by the departure indicator.

In circumstances where the transit timeline comprises a planned commute departure and at least one alternative departure indicator, at least one graphical characteristic of the planned commute departure may differ from at least one graphical characteristic of the alternative departure indicator. For example, at least one graphical characteristic of the planned commute departure may differ from at least one graphical characteristic of the alternative departure indicator by way of color, opacity, length, shape, and/or the like.

In at least one example embodiment, the apparatus determines that the scheduled departure time has changed to a different time, and causes placement of the departure indicator to correspond with the different time. For example, there may be a delay in arrival of a vehicle associated with the departure time, etc. In such an example, the apparatus may cause placement of the departure indicator to correspond with the different time.

In at least one example embodiment, the apparatus determines that the commute relies on at least one departure time represented by the departure indicator. For example, the apparatus may determine the commute to rely on the departure. In at least one example embodiment, reliance on the departure time relates to subsequent parts of the transit timeline being based, at least in part, on a commuter departing in accordance with the departure time. In at least one example embodiment, the apparatus determines that an arrival upon which a departure indicated by the departure indicator relates to a time that precludes inclusion of the departure in the commute. For example, there may be a delay along a route associated with a commute that causes the user to miss a departure time associated with a departure indicator. The apparatus may determine that the arrival relates to a time that precludes inclusion of the departure comprises determining that the arrival is after the departure. In at least one example embodiment, determining that the arrival relates to a time that precludes inclusion of the departure comprises determining that the arrival is within a transition threshold duration prior to the departure. A transition threshold may relate to an estimated time associated with a user being able to transition at a waypoint. Upon determining that the departure indicator relates to a time that precludes inclusion of the departure in the commute the apparatus may cause determination of the transit timeline based, at least in part, on an alternative departure. In such circumstances, the apparatus may select the alternative departure, for example to become a departure upon which the commute is based. The alternative departure may be selected based, at least in part, on being a next departure after the arrival being a next departure after a transition threshold duration subsequent to the arrival, and/or the like.

FIG. 6A is a diagram illustrating a representation of a transit timeline comprising start location representation 601 current time indicator 608, route designation indicator 605, waypoint 603, route designation indicator 606, landmark 604, route designation indicator 607, destination location indicator 602, and departure indicator 610. It can be seen that departure indicator 610 corresponds with waypoint 603. Time along the representation of the timeline subsequent to departure time 610 may rely on the departure indicated by departure indicator 610. It can be seen that departure indicator 610 relates to a line to the timeline representation extending from the center point.

FIG. 6B is a diagram illustrating a representation of a transit timeline comprising start location representation 621 current time indicator 628, route designation indicator 625, waypoint 623, route designation indicator 626, landmark 624, route designation indicator 627, destination location indicator 622, planned departure indicator 630, alternative departure indicator 631, and alternative departure indicator 632. It can be seen that departure indicator 630 corresponds with waypoint 623. Time along the representation of the timeline subsequent to departure time 630 may rely on the departure indicated by departure indicator 630. It can be seen that departure indicator 630 relates to a line to the timeline representation extending from the center point.

Figure 7:
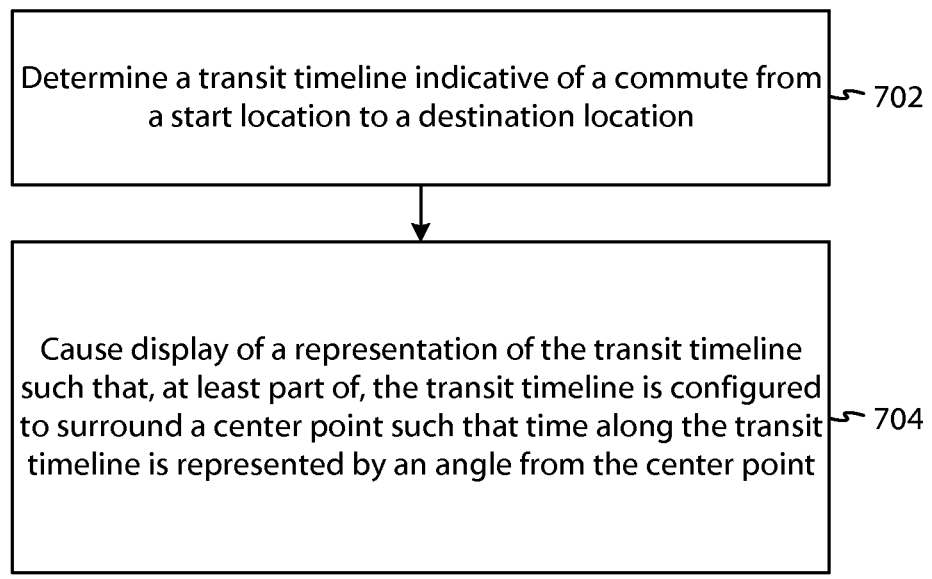
FIG. 7 is a flow diagram illustrating activities associated with a transit timeline according to at least one example embodiment.

FIG. 7 is a flow diagram illustrating activities associated with a transit timeline according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines a transit timeline indicative of a commute from a start location to a destination location. The determination, the transit timeline, the commute, the start location, and the destination location may be similar as described regarding FIGS. 2A-2D.

At block 704, the apparatus causes display of a representation of the transit timeline such that, at least part of, the transit timeline is configured to surround a center point such that time along the transit timeline is represented by an angle from the center point. The causation of display, the representation of the transit timeline, the configuration, the center point, and the representation of time may be similar as described regarding FIGS. 2A-2D, FIGS. 3A-3E, FIGS. 4A-4C, FIGS. 5A-5C, and FIGS. 6A-6B.

Figure 8:
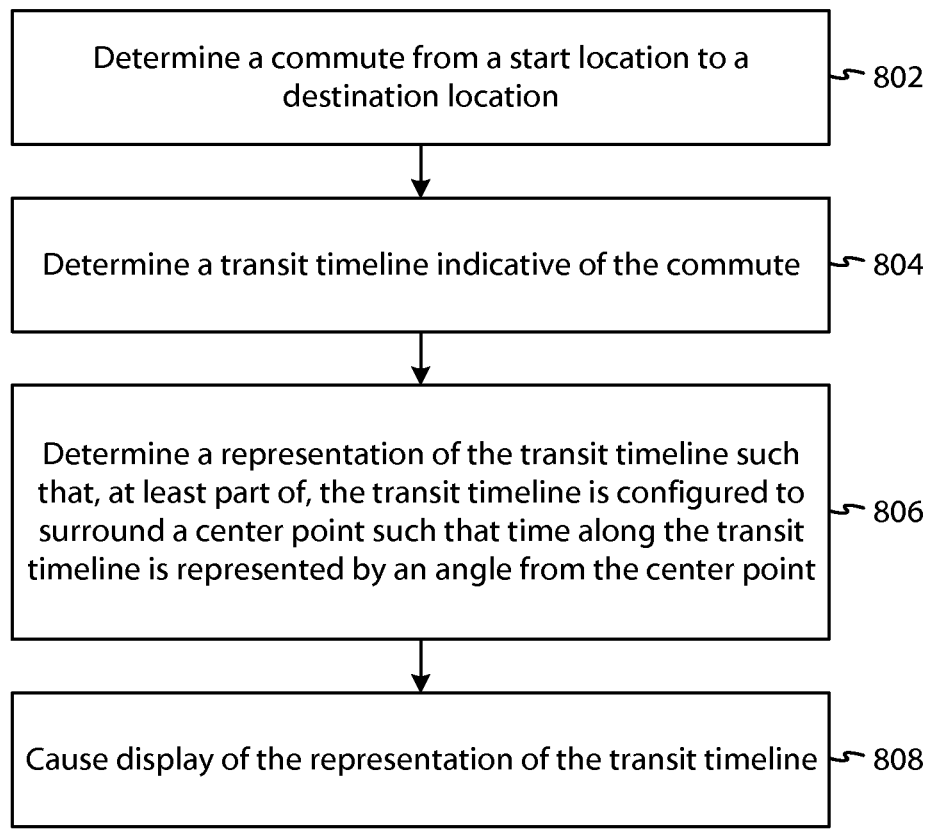
FIG. 8 is a flow diagram illustrating activities associated with a transit timeline according to at least one example embodiment.

FIG. 8 is a flow diagram illustrating activities associated with a transit timeline according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus determines a commute from a start location to a destination location. The determination, the commute, the start location, and the destination location may be similar as described regarding FIGS. 2A-2D, FIG. 9.

At block 804, the apparatus determines a transit timeline indicative of the commute. The determination and the transit timeline may be similar as described regarding FIGS. 2A-2D, FIG. 10.

At block 806, the apparatus determines a representation of the transit timeline such that, at least part of, the transit timeline is configured to surround a center point such that time along the transit timeline is represented by an angle from the center point. The determination, the representation of the transit timeline, the configuration, the center point, and the representation of time may be similar as described regarding FIGS. 2A-2D, FIGS. 3A-3E, FIGS. 4A-4C, FIGS. 5A-5C, and FIGS. 6A-6B.

At block 808, the apparatus causes display of the representation of the transit timeline. The causation of display may be similar as described regarding FIGS. 3A-3E.

Figure 9:
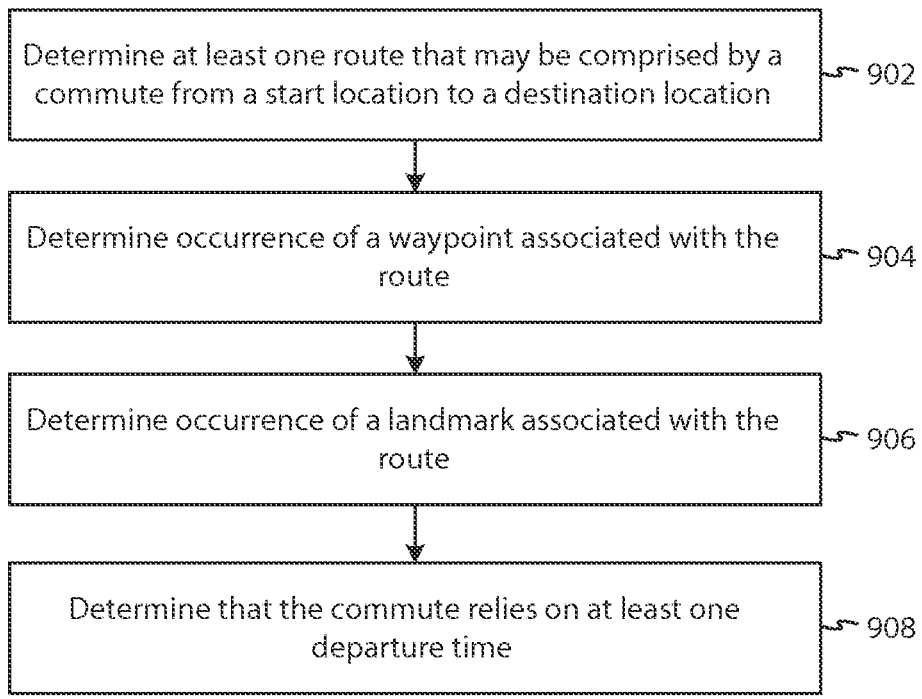
FIG. 9 is a flow diagram illustrating activities associated with determination of a transit timeline according to at least one example embodiment.

FIG. 9 is a flow diagram illustrating activities associated with determination of a transit timeline according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus determines at least one route that may be comprised by a commute from a start location to a destination location. The determination, the route, the commute, the start location, and the destination location may be similar as described regarding FIGS. 2A-2D.

At block 904, the apparatus determines occurrence of a waypoint associated with the route. The determination and the waypoint may be similar as described regarding FIGS. 2A-2D.

At block 906, the apparatus determines occurrence of a landmark associated with the route. The determination and the landmark may be similar as described regarding FIGS. 2A-2D.

At block 908, the apparatus determines that the commute relies on at least one departure time. The determination, the reliance, and the departure time may be similar as described regarding FIGS. 6A-6B.

Figure 10:
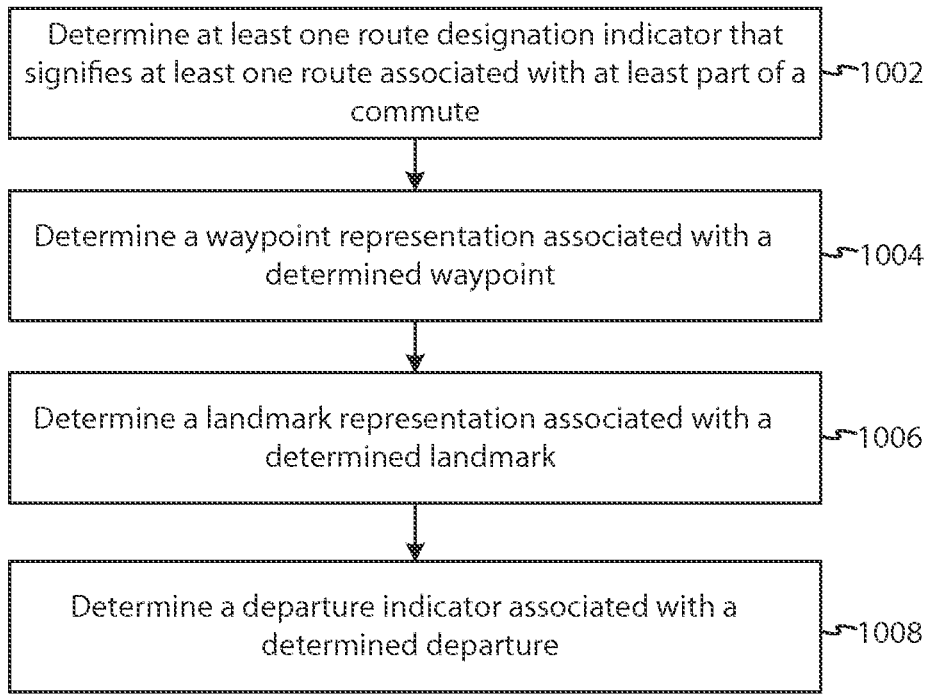
FIG. 10 is a flow diagram illustrating activities associated with determination of a commute according to at least one example embodiment.

FIG. 10 is a flow diagram illustrating activities associated with determination of a commute according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus determines at least one route designation indicator that signifies at least one route associated with at least part of a commute. The determination, the route designation indicator, the route, and the commute may be similar as described regarding FIGS. 2A-2D.

At block 1004, the apparatus determines a waypoint representation associated with a determined waypoint. The determination and the waypoint representation may be similar as described regarding FIGS. 2A-2D.

At block 1006, the apparatus determines a landmark representation associated with a determined landmark. The determination and the landmark representation may be similar as described regarding FIGS. 2A-2D.

At block 1008, the apparatus determines a departure indicator associated with a determined departure. The determination and the departure indicator may be similar as described regarding FIGS. 6A-6B.

Figure 11:
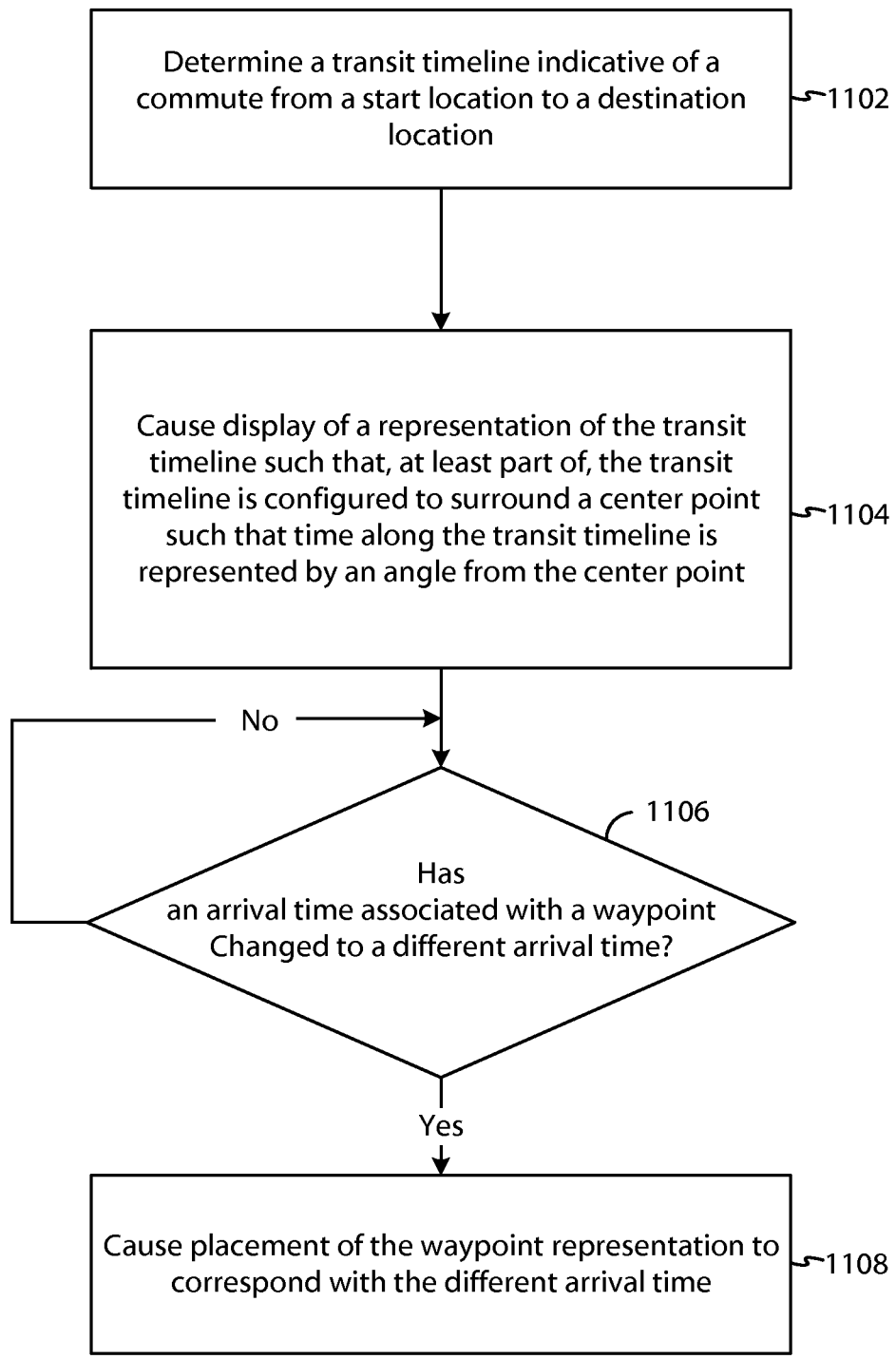
FIG. 11 is a flow diagram illustrating activities associated with a transit timeline according to at least one example embodiment.

FIG. 11 is a flow diagram illustrating activities associated with a transit timeline according to at least one example embodiment. In at least one example embodiment, there is a set of operations that corresponds the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines a transit timeline indicative of a commute from a start location to a destination location, similarly as described regarding block 702 of FIG. 7. At block 1104, the apparatus causes display of a representation of the transit timeline such that, at least part of, the transit timeline is configured to surround a center point such that time along the transit timeline is represented by an angle from the center point, similarly as described regarding block 704 of FIG. 7.

At block 1106, the apparatus determines whether an arrival time associated with a waypoint has changed to a different arrival time. The determination, the arrival time, the waypoint and the change may be similar as described regarding FIGS. 2A-2D. If the apparatus determines that the arrival time associated with a waypoint has changed to a different arrival time, flow proceeds to block 1108. If the apparatus determines that the arrival time associated with a waypoint has not changed to a different arrival time, flow proceeds to block 1106.

At block 1108, the apparatus causes placement of the waypoint representation to correspond with the different arrival time. The placement may be similar as described regarding FIGS. 2A-2B.

Figure 12:
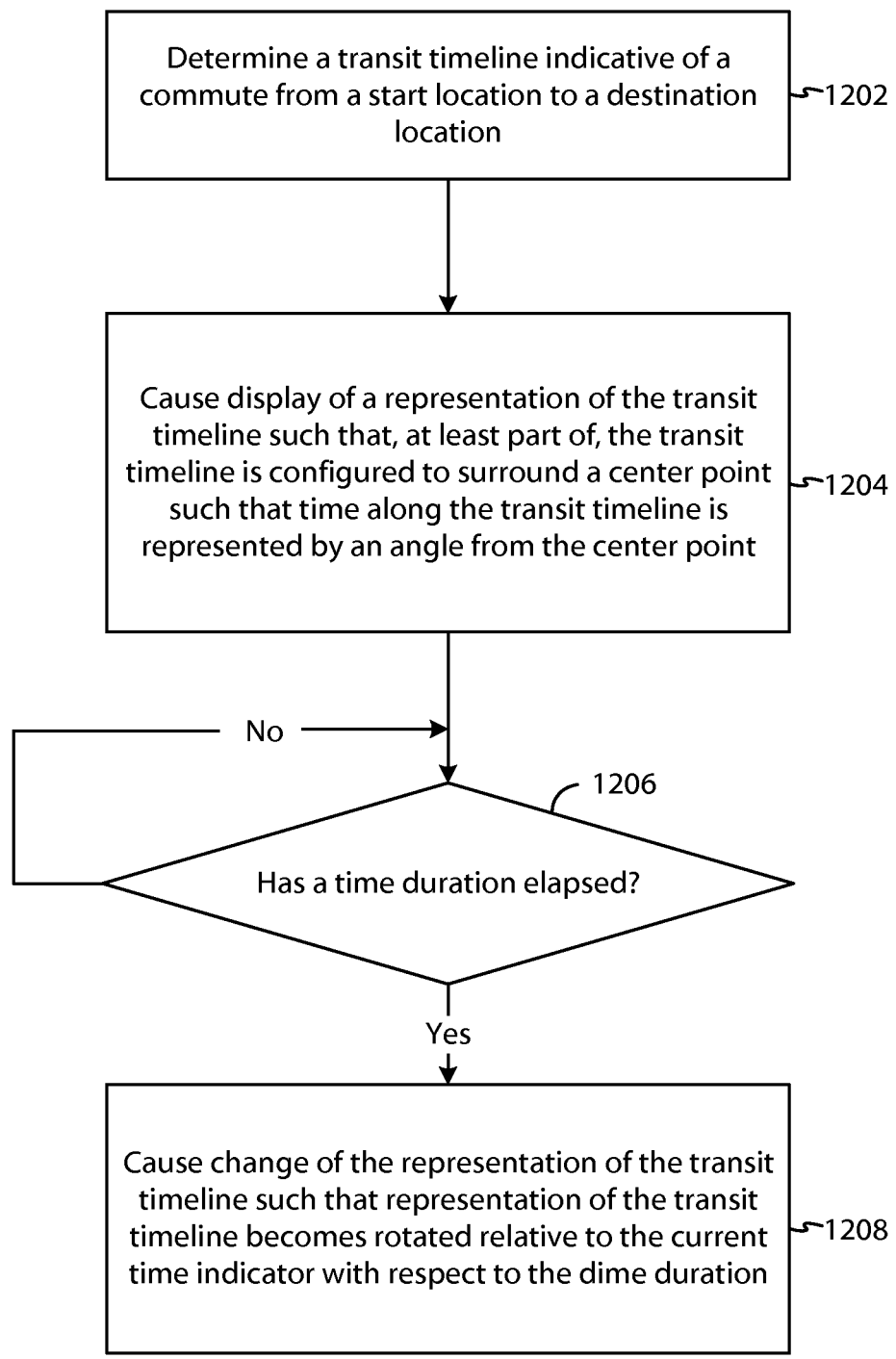
FIG. 12 is a flow diagram illustrating activities associated with a transit timeline according to at least one example embodiment.

FIG. 12 is a flow diagram illustrating activities associated with a transit timeline according to at least one example embodiment. In at least one example embodiment, there is a set of operations that corresponds the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus determines a transit timeline indicative of a commute from a start location to a destination location, similarly as described regarding block 702 of FIG. 7. At block 1204, the apparatus causes display of a representation of the transit timeline such that, at least part of, the transit timeline is configured to surround a center point such that time along the transit timeline is represented by an angle from the center point, similarly as described regarding block 704 of FIG. 7.

At block 1206, the apparatus determines whether a time duration has elapsed. The time duration may be similar as described regarding FIGS. 3A-3E and FIGS. 5A-5C. If the apparatus determines that the time duration has elapsed, flow proceeds to block 1208. If the apparatus determines that the time duration has not elapsed, flow proceeds to block 1206.

At block 1208, the apparatus causes change of the representation of the transit timeline such that representation of the transit timeline becomes rotated relative to the current time indicator with respect to the dime duration. The change, the rotation, and the current time indicator may be similar as described regarding FIGS. 3A-3E, FIGS. 4A-4C, and FIGS. 5A-5C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1004 of FIG. 10 may be performed after block 1006. Furthermore, if desired, one or more of the above-described functions may be optional or may be combined. For example, blocks 902, 904, 906, and 908 of FIG. 9 may be optional and/or combined with block 702 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor;
    at least one memory including computer program code, the memory and the computer program code configured to, working with the processor, cause the apparatus to perform at least the following:
    determining a transit timeline indicative of a commute from a start location to a destination location; and
    causing display of a representation of the transit timeline such that, at least part of, the transit timeline is configured to surround a center point such that time along the transit timeline is represented by an angle from the center point.

2. The apparatus of claim 1, wherein the representation of the transit timeline is configured to surround a center point such that one minute along the transit timeline is represented by a six degree angle from the center point.

3. The apparatus of claim 1, wherein:
the transit timeline spans a transit duration that exceeds a three hundred sixty degree representational duration;
the representation of the transit timeline relates to a part of the transit timeline that corresponds with a duration that is less than or equal to a duration that corresponds with a three hundred sixty degree representational duration; and
the representation of the transit timeline comprises a preceding time indicator that indicates a duration between a part of the transit timeline and a start of the representation of the transit timeline.

4. The apparatus of claim 1, wherein:
the transit timeline spans a transit duration that exceeds a three hundred sixty degree representational duration;
the representation of the transit timeline relates to a part of the transit timeline that corresponds with a duration that is less than or equal to a duration that corresponds with a three hundred sixty degree representational duration; and
the representation of the transit timeline comprises a subsequent time indicator that indicates a duration between a part of the transit timeline and a terminus of the representation of the transit timeline.

5. The apparatus of claim 1, wherein the time along the transit timeline is represented by a segment on the timeline associated to a correspondent angle from the center point.

6. The apparatus of claim 1, wherein:
the representation of the transit timeline comprises a current time indicator;
the current time indicator is configured to remain at a designated position with respect to passage of time; and
the representation of the transit timeline is configured to rotate counter-clockwise relative to the current time indicator with respect to the passage of time.

7. The apparatus of claim 1, wherein the transit timeline comprises at least one departure indicator.

8. The apparatus of claim 1, wherein
the transit timeline spans a transit duration that exceeds a three hundred sixty degree representational duration; and
the representation of the transit timeline is configured to be spiral surrounding the center point.

9. The apparatus of claim 1, wherein the apparatus comprises a display and the causing of display of a representation of the transit timeline comprises displaying the representation of the transit timeline on the display.

10. A method comprising:
determining a transit timeline indicative of a commute from a start location to a destination location; and
causing display of a representation of the transit timeline such that, at least part of, the transit timeline is configured to surround a center point such that time along the transit timeline is represented by an angle from the center point.

11. The method of claim 10, wherein the representation of the transit timeline is configured to surround a center point such that one minute along the transit timeline is represented by a six degree angle from the center point.

12. The method of claim 10, wherein:
the transit timeline spans a transit duration that exceeds a three hundred sixty degree representational duration;
the representation of the transit timeline relates to a part of the transit timeline that corresponds with a duration that is less than or equal to a duration that corresponds with a three hundred sixty degree representational duration; and
the representation of the transit timeline comprises a preceding time indicator that indicates a duration between a part of the transit timeline and a start of the representation of the transit timeline.

13. The method of claim 10, wherein:
the transit timeline spans a transit duration that exceeds a three hundred sixty degree representational duration;
the representation of the transit timeline relates to a part of the transit timeline that corresponds with a duration that is less than or equal to a duration that corresponds with a three hundred sixty degree representational duration; and
the representation of the transit timeline comprises a subsequent time indicator that indicates a duration between a part of the transit timeline and a terminus of the representation of the transit timeline.

14. The method of claim 10, wherein the time along the transit timeline is represented by a segment on the timeline associated to a correspondent angle from the center point.

15. The method of claim 10, wherein:
the representation of the transit timeline comprises a current time indicator;
the current time indicator is configured to remain at a designated position with respect to passage of time; and
the representation of the transit timeline is configured to rotate counter-clockwise relative to the current time indicator with respect to the passage of time.

16. The method of claim 10, wherein the transit timeline comprises at least one departure indicator.

17. At least one computer-readable medium encoded with instructions that, when executed by a computer, perform:
determining a transit timeline indicative of a commute from a start location to a destination location; and
causing display of a representation of the transit timeline such that, at least part of, the transit timeline is configured to surround a center point such that time along the transit timeline is represented by an angle from the center point.

18. The medium of claim 17, wherein the representation of the transit timeline is configured to surround a center point such that one minute along the transit timeline is represented by a six degree angle from the center point.

19. The medium of claim 17, wherein:
the transit timeline spans a transit duration that exceeds a 360 degree representational duration;
the representation of the transit timeline relates to a part of the transit timeline that corresponds with a duration that is less than or equal to a duration that corresponds with a three hundred sixty degree representational duration; and
the representation of the transit timeline comprises a preceding time indicator that indicates a duration between a part of the transit timeline and a start of the representation of the transit timeline.

20. The medium of claim 17, wherein:
the transit timeline spans a transit duration that exceeds a three hundred sixty degree representational duration;
the representation of the transit timeline relates to a part of the transit timeline that corresponds with a duration that is less than or equal to a duration that corresponds with a three hundred sixty degree representational duration; and
the representation of the transit timeline comprises a subsequent time indicator that indicates a duration between a part of the transit timeline and a terminus of the representation of the transit timeline.

* * * * *